US010975265B2

(12) United States Patent
Ito et al.

(10) Patent No.: US 10,975,265 B2
(45) Date of Patent: Apr. 13, 2021

(54) RADICAL-CURABLE ADHESIVE COMPOSITION AND ADHESIVE

(71) Applicant: SHOWA DENKO K.K., Tokyo (JP)

(72) Inventors: Ryohei Ito, Tokyo (JP); Tsunehiko Nishimura, Tokyo (JP); Akifumi Tamura, Tokyo (JP); Nobuyuki Takahashi, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 45 days.

(21) Appl. No.: 16/304,350

(22) PCT Filed: Jun. 9, 2017

(86) PCT No.: PCT/JP2017/021532
§ 371 (c)(1),
(2) Date: Nov. 26, 2018

(87) PCT Pub. No.: WO2018/008332
PCT Pub. Date: Jan. 11, 2018

(65) Prior Publication Data
US 2019/0169468 A1    Jun. 6, 2019

(30) Foreign Application Priority Data
Jul. 4, 2016 (JP) .............................. JP2016-132414

(51) Int. Cl.
| | |
|---|---|
| *C09J 4/06* | (2006.01) |
| *C09J 11/04* | (2006.01) |
| *C09J 11/06* | (2006.01) |
| *C09J 109/02* | (2006.01) |
| *C09J 121/00* | (2006.01) |
| *C09J 133/10* | (2006.01) |
| *C08K 3/013* | (2018.01) |

(52) U.S. Cl.
CPC ............... *C09J 4/06* (2013.01); *C09J 11/04* (2013.01); *C09J 11/06* (2013.01); *C09J 109/02* (2013.01); *C09J 121/00* (2013.01); *C09J 133/10* (2013.01); *C08K 3/013* (2018.01)

(58) Field of Classification Search
CPC ..... C09J 4/06; C09J 11/04; C09J 11/06; C09J 121/00; C09J 133/10; C09J 109/02; C08K 3/013
See application file for complete search history.

(56) References Cited

U.S. PATENT DOCUMENTS

| | | | |
|---|---|---|---|
| 9,051,408 B2 * | 6/2015 | Coqueret | ............. C08F 283/06 |
| 2009/0071697 A1 | 3/2009 | Ishikawa et al. | |
| 2013/0197130 A1 * | 8/2013 | Wang | ........................ C09J 4/06 |
| | | | 523/434 |

FOREIGN PATENT DOCUMENTS

| | | |
|---|---|---|
| CN | 101392154 A | 3/2009 |
| CN | 102177205 A | 9/2011 |
| CN | 103534327 A | 1/2014 |
| CN | 103555261 A | 2/2014 |
| JP | 60-158283 A | 8/1985 |
| JP | 61-069819 A | 4/1986 |
| JP | 61-148215 A | 7/1986 |
| JP | 03-294329 A | 12/1991 |
| JP | 06-009738 A | 1/1994 |
| JP | 07-326635 A | 12/1995 |
| JP | 09-241585 A | 9/1997 |
| JP | 2000-313869 A | 11/2000 |
| JP | 2008-094913 A | 4/2008 |
| WO | 2007/052523 A1 | 5/2007 |

OTHER PUBLICATIONS

Communication dated Feb. 19, 2020, from the European Patent Office in European Application No. 17823939.8.
Communication dated Sep. 23, 2019, from the China National Intellectual Property Administration in counterpart Application No. 201780028709.4.
T. Ogawa, Adhesion technology, The Adhesion Society of Japan, 2011, pp. 1-6, vol. 31, No. 3.
International Search Report of PCT/JP2017/021532 dated Jul. 18, 2017.
Communication dated Jun. 9, 2020, from the State Intellectual Property Office of the P.R.C in application No. 201780028709.4.

* cited by examiner

*Primary Examiner* — Sanza L. McClendon
(74) *Attorney, Agent, or Firm* — Sughrue Mion, PLLC

(57) ABSTRACT

A radical-curable adhesive composition containing a rubber (a) having one or more (meth)acryloyl groups within a single molecular chain, a polymerizable monomer (b) having both an epoxy group and a (meth)acryloyloxy group in the molecule, and a radical polymerization initiator (c). The rubber (a) is preferably a polymer of a monomer containing at least acrylonitrile.

13 Claims, No Drawings

RADICAL-CURABLE ADHESIVE COMPOSITION AND ADHESIVE

CROSS REFERENCE TO RELATED APPLICATIONS

This application is a National Stage of International Application No. PCT/JP2017/021532 filed Jun. 9, 2017, claiming priority based on Japanese Patent Application No. 2016-132414 filed Jul. 4, 2016.

TECHNICAL FIELD

The present invention relates to a radical-curable adhesive composition and an adhesive.

Priority is claimed on Japanese Patent Application No. 2016-132414, filed Jul. 4, 2016, the content of which is incorporated herein by reference.

BACKGROUND ART

Vinyl ester resins have excellent properties including mechanical properties, chemical resistance, heat resistance and oxidation resistance. Accordingly, vinyl ester resins are used in a broad range of fields. In particular, vinyl ester resins are widely used as materials for adhesives. Adhesive compositions containing a vinyl ester resin exhibit powerful adhesive strength to metals, and are therefore widely used in fields such as the electrical and mechanical fields, vehicles, and construction materials.

One example of an adhesive composition containing a vinyl ester resin is an adhesive composition containing a vinyl ester resin and a rubber. The cured product of this adhesive composition exhibits superior adhesive strength.

Patent Document 1 discloses a curable resin composition prepared by adding a radical generator to a mixture containing a vinyl ester resin composition having 1% by weight to 30% by weight of a rubber with a particle size of not more than 1 μm dispersed therein and a polymerizable monomer.

Patent Document 2 discloses a one-liquid radical-curable adhesive composition composed of a hindered amine compound having a specific structure, an organic peroxide, an acrylic monomer, and a polymerizable oligomer having two or more (meth)acryloyl groups within the molecule.

Patent Document 3 discloses a heat-resistant acrylic-based adhesive composition containing methacrylic acid, a (meth)acrylic monomer other than methacrylic acid containing isobornyl (meth)acrylate, a liquid rubber having a polymerizable unsaturated double bond at the terminal, an organic peroxide, and a reducing agent.

Further, as disclosed in Non-Patent Document 1, polymer materials exhibit very different surface tension values from metals and typical adhesives such as polyvinyl acetate emulsions and epoxy-based adhesives. Accordingly, conventionally, substrate surfaces are subjected to a surface treatment to adjust the surface tension of the substrate to a value close to the surface tension of the adhesive, thereby improving the adhesive strength of the adhesive to the substrate. As described in Non-Patent Document 1, examples of surface treatment methods include physical methods and chemical methods. Examples of the physical methods include sanding, corona, plasma, flame and ultraviolet treatments. In terms of the chemical methods, methods in which functional groups having high polarity are introduced onto the substrate surface are becoming increasingly widespread.

PRIOR ART LITERATURE

Patent Documents

Patent Document 1: Japanese Unexamined Patent Application, First Publication No. Hei 06-9738
Patent Document 2: Japanese Unexamined Patent Application, First Publication No. 2008-94913
Patent Document 3: Japanese Unexamined Patent Application, First Publication No. Hei 09-241585

Non-Patent Document

Non-Patent Document 1: Adhesion technology, Vol. 31, No. 3, 2011, pp. 1 to 6 (published by The Adhesion Society of Japan)

DISCLOSURE OF INVENTION

Problems to be Solved by the Invention

However, conventional adhesive compositions have been unable to produce cured products that exhibit good adhesive strength to metals and plastics under high-temperature conditions.

In order to achieve superior adhesive strength to both metals and plastics, which are materials of different surface tensions, the surface of the substrate may be subjected to a surface treatment. However, when the surface of a substrate is subjected to a surface treatment, there is a possibility that the substrate may suffer damage such as shrinkage, deformation or degradation. Further, because a step of performing the surface treatment of the substrate surface becomes necessary prior to bonding of the substrate, extra effort is required, and costs tend to increase. Accordingly, it is preferable that the surface of the substrate undergoing bonding is not subjected to a surface treatment.

Further, some adhesive compositions are used as adhesives and/or encapsulating agents for electrical and electronic componentry. The cured products of adhesive compositions used for these types of applications are required to exhibit superior adhesive strength under high-temperature conditions, particularly to the metals and plastics that are used as the materials for the electrical and electronic components.

Moreover, some adhesive compositions are used as adhesives for transportation equipment. The cured products of adhesive compositions used for these types of applications are required to exhibit superior adhesive strength under high-temperature conditions, particularly to the metals and plastics that are used as the materials for the transportation equipment.

The present invention has been developed in light of the above circumstances, and has an object of providing a radical-curable adhesive composition which yields a cured product that exhibits excellent adhesive strength under high-temperature conditions to metals and plastics without requiring a surface treatment.

Further, the present invention also has an object of providing an adhesive which contains the radical-curable adhesive composition described above, and exhibits excellent adhesive strength under high-temperature conditions to substrates formed from metals and/or plastics.

Furthermore, the present invention also has an object of providing an electrical or electronic component and a transportation device in which a component has been bonded and/or encapsulated by a cured product of the radical-curable adhesive composition described above.

Means for Solving the Problems

The inventors of the present invention undertook intensive research with the aim of achieving the above objects.

As a result, they discovered a radical-curable adhesive composition containing, as essential components, a rubber having one or more (meth)acryloyl groups within a single molecular chain, a polymerizable monomer having both an epoxy group and a (meth)acryloyloxy group in the molecule, and a radical polymerization initiator, and were thus able to conceive of the present invention.

In the present description and the claims, the term "(meth) acryloyloxy group" means an acryloyloxy group or a methacryloyloxy group. Similarly, a "(meth)acryloyl group" means an acryloyl group or a methacryloyl group, "(meth) acrylic acid" means acrylic acid or methacrylic acid, and a "(meth)acrylate" means an acrylate or a methacrylate.

The present invention was completed based on the above discovery, and a summary of the invention is as follows.
[1] A radical-curable adhesive composition containing:
a rubber (a) having one or more (meth)acryloyl groups within a single molecular chain,
a polymerizable monomer (b) having both an epoxy group and a (meth)acryloyloxy group in the molecule, and
a radical polymerization initiator (c).
[2] The radical-curable adhesive composition according to [1], wherein the rubber (a) is a polymer of a monomer containing at least acrylonitrile.
[3] The radical-curable adhesive composition according to [1] or [2], wherein the main chain of the rubber (a) is a copolymer of acrylonitrile and butadiene.
[4] The radical-curable adhesive composition according to any one of [1] to [3], wherein the polymerizable monomer (b) contains glycidyl (meth)acrylate.
[5] The radical-curable adhesive composition according to any one of [1] to [4], also containing a polymerizable monomer (d) other than the polymerizable monomer (b) and excluding (meth)acrylic acid.
[6] The radical-curable adhesive composition according to any one of [1] to [5], wherein the total amount of the polymerizable monomer (b) and the polymerizable monomer (d) other than the polymerizable monomer (b) and excluding (meth)acrylic acid is from 20 to 200 parts by mass per 100 parts by mass of the rubber (a).
[7] The radical-curable adhesive composition according to any one of [1] to [6], wherein the amount of the polymerizable monomer (b) is from 10 to 100 parts by mass per 100 parts by mass of the total amount of the polymerizable monomer (b) and the polymerizable monomer (d) other than the polymerizable monomer (b) and excluding (meth)acrylic acid.
[8] The radical-curable adhesive composition according to any one of [1] to [7], also containing a vinyl ester compound (e).
[9] The radical-curable adhesive composition according to [8], wherein the total amount of the rubber (a) and the vinyl ester compound (e) is from 105 to 200 parts by mass per 100 parts by mass of the rubber (a).
[10] The radical-curable adhesive composition according to any one of [1] to [9], also containing an inorganic filler (f).
[11] The radical-curable adhesive composition according to [10], containing 3 to 1,000 parts by mass of the inorganic filler (f) per 100 parts by mass of the total amount of the rubber (a), the polymerizable monomer (b), the radical polymerization initiator (c), the polymerizable monomer (d) other than the polymerizable monomer (b) and excluding (meth)acrylic acid, and the vinyl ester compound (e).
[12] The radical-curable adhesive composition according to any one of [1] to [11], wherein the cured product of the adhesive composition has insulating properties.
[13] An adhesive containing the radical-curable adhesive composition according to any one of [1] to [12].
[14] An electrical or electronic component in which a component has been bonded and/or encapsulated using a cured product of the radical-curable adhesive composition according to any one of [1] to [12].
[15] A transportation device in which a component has been bonded using a cured product of the radical-curable adhesive composition according to any one of [1] to [12].

Effects of the Invention

The radical-curable adhesive composition of the present invention contains a rubber having one or more (meth) acryloyl groups within a single molecular chain, a polymerizable monomer having both an epoxy group and a (meth) acryloyloxy group in the molecule, and a radical polymerization initiator. Accordingly, by curing the radical-curable adhesive composition of the present invention, a cured product that exhibits superior adhesive strength to metals and plastics under high-temperature conditions can be obtained. As a result, the radical-curable adhesive composition of the present invention can be used favorably as an adhesive and/or an encapsulating agent for electrical or electronic componentry, and as an adhesive for transportation equipment.

The adhesive of the present invention contains the radical-curable adhesive composition of the present invention, and therefore exhibits excellent adhesive strength under high-temperature conditions to substrates composed of metals and/or plastics without requiring a surface treatment.

Further, an electrical or electronic component of the present invention has a component that has been bonded and/or encapsulated using a cured product of the radical-curable adhesive composition of the present invention, and therefore has favorable heat resistance. Moreover, a transportation device of the present invention has a component that has been bonded using a cured product of the radical-curable adhesive composition of the present invention, and therefore has favorable heat resistance.

PREFERRED EMBODIMENTS

The radical-curable adhesive composition, the adhesive and the electrical or electronic component of the present invention are described below in further detail.
[Radical-Curable Adhesive Composition]
The radical-curable adhesive composition of this embodiment of the present invention (hereafter sometimes referred to as "the adhesive composition") contains, as essential components, a rubber (a) having one or more (meth)acryloyl groups within a single molecular chain (hereafter sometimes referred to as "the rubber (a)"), a polymerizable monomer (b) having both an epoxy group and a (meth)acryloyloxy group in the molecule (hereafter sometimes referred to as "the polymerizable monomer (b)"), and a radical polymerization initiator (c).

The adhesive composition of the present embodiment may also contain, besides the rubber (a), the polymerizable monomer (b) and the radical polymerization initiator (c), one or more components selected from among a polymerizable monomer (d) other than the polymerizable monomer (b) and excluding (meth)acrylic acid (hereafter sometimes referred to as "the polymerizable monomer (d)"), a vinyl ester compound (e), and an inorganic filler (f).

<Rubber (a) Having One or More (Meth)Acryloyl Groups within a Single Molecular Chain>

The rubber (a) in the adhesive composition of the present embodiment has the functions of improving the heat resistance and the flexibility of the cured product of the adhesive composition, and improving the adhesive strength to metals and plastics.

There are no particular limitations on the rubber (a) having one or more (meth)acryloyl groups within a single molecular chain, provided the rubber has one or more (meth)acryloyl groups within a single molecular chain and has a rubber structure within the skeleton. The rubber (a) may have one or more branched structures within the molecule chain. The rubber (a) is preferably a polymer of a monomer that includes at least acrylonitrile. The main chain of the rubber (a) is preferably a copolymer of acrylonitrile and butadiene.

Further, from the viewpoint of ensuring favorable compatibility with the polymerizable monomer (b) having both an epoxy group and a (meth)acryloyloxy group in the molecule, the rubber (a) is preferably a liquid at 25° C., and more preferably has a viscosity at 25° C. of not more than 1,000,000 mPa·s.

The (meth)acryloyl group of the rubber (a) may be introduced by modifying the rubber skeleton. Further, the (meth)acryloyl group of the rubber (a) may also be introduced within the rubber skeleton, by copolymerizing vinyl methacrylate with the monomers used in forming the rubber skeleton such as butadiene and acrylonitrile.

From the viewpoint of the heat resistance of the cured product of the adhesive composition, the rubber (a) preferably has an average of one to three (meth)acryloyl groups within a single molecular chain, and more preferably has two (meth)acryloyl groups within a single molecular chain. A combination of a plurality of compounds having different numbers of (meth)acryloyl groups within the molecular chain may also be used as the rubber (a).

Examples of the skeleton of the rubber (a) include butadiene rubber, chloroprene rubber, styrene-butadiene rubber, acrylonitrile-butadiene rubber, and hydrogenated acrylonitrile-butadiene rubber and the like. One of these rubber skeletons may be used alone, or a combination of a plurality of skeletons may be used. Among the various skeletons described above for the rubber (a), acrylonitrile-butadiene rubber and hydrogenated acrylonitrile-butadiene rubber are preferred from the viewpoint of the compatibility with the polymerizable monomer (b) having both an epoxy group and a (meth)acryloyloxy group in the molecule, and an acrylonitrile-butadiene rubber is particularly preferred.

The number average molecular weight of the rubber (a) is preferably within a range from 1,000 to 20,000, more preferably within a range from 2,000 to 10,000, and even more preferably within a range from 3,000 to 6,000. Provided the molecular weight of the rubber (a) is at least 1,000, curing of the adhesive composition is able to produce a cured product that exhibits superior adhesive strength under high-temperature conditions to metals and plastics, and also has excellent mechanical strength with favorable fatigue resistance. Further, provided the molecular weight of the rubber (a) is not more than 20,000, an adhesive composition having a viscosity that ensures favorable handling properties is obtained.

Examples of commercially available rubbers (a) include RIPOXY (a registered trademark) EFN-1000 (manufactured by Showa Denko K.K.), and HYPRO (a registered trademark) 1300X33LC VTBNX and 1300X43LC VTBNX (manufactured by Emerald Performance Materials, LLC), which are vinyl ester-modified acrylonitrile-butadiene rubbers.

<Polymerizable Monomer (b) Having Both an Epoxy Group and a (Meth)Acryloyloyloxy Group in the Molecule>

The polymerizable monomer (b) in the adhesive composition of the present embodiment has the functions of improving the heat resistance and the hardness of the cured product of the adhesive composition, and improving the adhesion and adhesive strength of the composition to metals and plastics.

There are no particular limitations on the polymerizable monomer (b), provided the monomer has both an epoxy group and a (meth)acryloyloxy group within the molecule. Specific examples of the polymerizable monomer (b) include glycidyl acrylate and glycidyl methacrylate. One of these polymerizable monomers (b) may be used alone, or a combination of a plurality of monomers may be used.

In those cases where the adhesive composition of the present embodiment does not contain a polymerizable monomer (d) other than the polymerizable monomer (b) and excluding (meth)acrylic acid, the amount of the polymerizable monomer (b), per 100 parts by mass of the rubber (a), is preferably from 20 to 200 parts by mass, more preferably from 30 to 160 parts by mass, and even more preferably from 40 to 120 parts by mass. Provided the amount of the polymerizable monomer (b) is at least 20 parts by mass per 100 parts by mass of the rubber (a), an adhesive composition capable of forming a cured product with even better adhesion to metals and plastics is obtained. Further, provided the amount of the polymerizable monomer (b), which has a higher acrylic equivalent weight than the rubber (a), is not more than 200 parts by mass per 100 parts by mass of the rubber (a), the amount of shrinkage during curing can be suppressed, which is desirable. Furthermore, the cured product of an adhesive composition in which the amount of the polymerizable monomer (b) is not more than 200 parts by mass per 100 parts by mass of the rubber (a) has favorable flexibility, and can therefore conform to thermal expansion of the substrate, meaning superior adhesive strength can be achieved under high-temperature conditions.

In those cases where the adhesive composition of the present embodiment contains the polymerizable monomer (d) other than the polymerizable monomer (b) and excluding (meth)acrylic acid, the total amount of the polymerizable monomer (b) and the polymerizable monomer (d), per 100 parts by mass of the rubber (a), is preferably from 20 to 200 parts by mass, more preferably from 30 to 160 parts by mass, and even more preferably from 40 to 120 parts by mass. Provided the total amount of the polymerizable monomer (b) and the polymerizable monomer (d) is at least 20 parts by mass per 100 parts by mass of the rubber (a), an adhesive composition having a viscosity that ensures favorable handling properties is obtained. Further, provided the total amount of the polymerizable monomer (b) and the polymerizable monomer (d) is not more than 200 parts by mass per 100 parts by mass of the rubber (a), an adhesive composition is obtained which exhibits a small amount of shrinkage upon curing, and yields a cured product upon curing containing minimal residual unreacted monomers.

In the adhesive composition of the present embodiment, the amount of the polymerizable monomer (b), relative to 100 parts by mass of the total amount of the polymerizable monomer (b) and the polymerizable monomer (d), is preferably from 10 to 100 parts by mass, more preferably from 30 to 95 parts by mass, and even more preferably from 50 to 85 parts by mass. Provided the amount of the polymerizable monomer (b) is at least 10 parts by mass per 100 parts by mass of the total amount of the polymerizable monomer (b) and the polymerizable monomer (d), a cured product that exhibits superior adhesive strength to both metals and plastics is obtained.

<Radical Polymerization Initiator (c)>

Examples of compounds that may be used as the radical polymerization initiator (c) include organic peroxides, azo-based initiators, and redox initiators and the like. Among these, from the viewpoint of reaction efficiency, the use of an organic peroxide as the radical polymerization initiator (c) is particularly preferred. Conventional compounds may be used as the organic peroxide, including cumene hydroperoxide, dialkyl peroxides, acyl peroxides, hydroperoxides, ketone peroxides and peroxy esters.

Specific examples of the organic peroxide include diisobutyryl peroxide, cumyl peroxyneodecanoate, di-n-propyl peroxydicarbonate, diisopropyl peroxydicarbonate, di-sec-butyl peroxydicarbonate, 1,1,3,3-tetramethylbutyl peroxyneodecanoate, di(4-t-butylcyclohexyl) peroxydicarbonate, di(2-ethylhexyl) peroxydicarbonate, t-hexyl peroxyneodecanoate, t-butyl peroxyneodecanoate, t-butyl peroxyneoheptanoate, t-hexyl peroxypivalate, t-butyl peroxypivalate, di(3,5,5-trimethylhexanoyl)peroxide, dilauroyl peroxide, 1,1,3,3-tetramethylbutyl peroxy-2-ethylhexanoate, t-butyl peroxy-2-ethylhexanoate, disuccinic acid peroxide, 2,5-dimethyl-2,5-di(2-ethylhexanoylperoxy)hexane, t-hexyl peroxy-2-ethylhexanoate, di(4-methylbenzoyl) peroxide, tert-butyl-2-ethyl peroxyhexanoate, di(3-methylbenzoyl) peroxide, benzoyl(3-methylbenzoyl) peroxide, dibenzoyl peroxide, 1,1-di(t-butylperoxy)-2-methylcyclohexane, 1,1-di(t-hexylperoxy)cyclohexane, 1,1-di(t-hexylperoxy)-3,3,5-trimethylcyclohexane, 1,1-di(t-butylperoxy)cyclohexane, 2,2-bis[4,4-di(t-butylperoxy)cyclohexyl]propane, t-hexyl peroxy isopropyl monocarbonate, t-butyl peroxy maleic acid, t-butyl peroxy-3,5,5-trimethylhexanoate, t-butyl peroxylaurate, t-butylperoxy isopropyl monocarbonate, t-butylperoxy-2-ethylhexyl monocarbonate, t-hexyl peroxybenzoate, 2,5-dimethyl-2,5-di(benzoylperoxy)hexane, t-butyl peroxyacetate, 2,2-di(t-butylperoxy)butane, t-butyl peroxybenzoate, n-butyl-4,4-di(t-butylperoxy)valerate, di(t-butylperoxyisopropyl)benzene, dicumyl peroxide, di(t-hexyl) peroxide, 2,5-dimethyl-2,5-di(t-butylperoxy)hexane, t-butylcumyl peroxide, di-t-butyl peroxide, p-menthane hydroperoxide, 2,5-dimethyl-2,5-di(t-butylperoxy)hexyne, diisopropylbenzene hydroperoxide, 1,1,3,3-tetramethylbutyl hydroperoxide, cumene hydroperoxide and t-butyl hydroperoxide.

Among the above organic peroxides, from the viewpoint of productivity, the one-hour half-life temperature is preferably from 50° C. to 130° C., more preferably from 60° C. to 120° C., and even more preferably from 70° C. to 110° C. From the viewpoints of the reaction temperature and the storage properties, t-butyl peroxy-2-ethylhexanoate which has a one-hour half-life temperature of 92° C. or 1,1-di(t-hexylperoxy)cyclohexane which has a one-hour half-life temperature of 107° C. is preferred.

One of these radical polymerization initiators (c) may be used alone, or a combination of a plurality of initiators may be used.

The amount of the radical polymerization initiator (c), relative to 100 parts by mass of the total amount of the rubber (a), the polymerizable monomer (b), the polymerizable monomer (d) and the vinyl ester compound (e) (the total of (a), (b), (d) and (e) (or the total of (a), (b) and (e) in those cases where (d) is not included, or the total of (a), (b) and (d) in those cases where (e) is not included, or the total of (a) and (b) in those cases where (d) and (e) are not included)), is preferably from 0.1 parts by mass to 10 parts by mass, more preferably from 0.5 parts by mass to 5 parts by mass, and even more preferably from 0.8 parts by mass to 3 parts by mass. Provided the amount of the radical polymerization initiator (c) is at least 0.1 parts by mass per 100 parts by mass of the aforementioned total of (a), (b), (d) and (e), a satisfactory curing rate can be achieved. On the other hand, provided the amount added of the radical polymerization initiator (c) is not more than 10 parts by mass per 100 parts by mass of the aforementioned total of (a), (b), (d) and (e), an adhesive composition having favorable storage stability can be obtained.

<Polymerizable Monomer (d) Other than the Polymerizable Monomer (b) and Excluding (Meth)Acrylic Acid>

The adhesive composition of the present embodiment preferably contains a polymerizable monomer (d) other than the polymerizable monomer (b) and excluding (meth)acrylic acid. The polymerizable monomer (d) in the adhesive composition of the present embodiment is included as a reactive diluent. Specifically, the polymerizable monomer (d) has the functions of adjusting the viscosity of the adhesive composition, the amount of shrinkage during curing, and the toughness and adhesive strength of the cured product.

Further, the polymerizable monomer (d) also has the functions of improving the heat resistance, the water resistance and the thermal shock resistance of the cured product.

There are no particular limitations on the polymerizable monomer (d), provided it cannot be classified as the polymerizable monomer (b) having both an epoxy group and a (meth)acryloyloxy group in the molecule, and is not (meth)acrylic acid. (Meth)acrylic acid has high volatility and has a strong irritating odor. Accordingly, if (meth)acrylic acid is included in the adhesive composition, the workability of the composition can sometimes become unsatisfactory during heat curing. Further, a cured product of an adhesive composition containing (meth)acrylic acid also suffers from low adhesive strength to plastics under high-temperature conditions. Accordingly, in the present embodiment, a compound excluding (meth)acrylic acid is used as the polymerizable monomer (d). A single polymerizable monomer (d) may be used alone, or a combination of a plurality of monomers may be used.

However, the adhesive composition of the present invention may include a small amount of (meth)acrylic acid, provided the workability of the composition is not impaired. The range in which the workability is not impaired typically means an amount of not more than 3% by mass of the total adhesive composition.

Examples of monofunctional monomers that may be used as the polymerizable monomer (d) include aliphatic (meth)acrylates such as methyl (meth)acrylate, ethyl (meth)acrylate, n-butyl (meth)acrylate, sec-butyl (meth)acrylate, t-butyl (meth)acrylate, 2-ethylhexyl (meth)acrylate, octyl (meth)acrylate, dodecyl (meth)acrylate, octadecyl (meth)acrylate, isobornyl (meth)acrylate, cyclohexyl (meth)acrylate, methylcyclohexyl (meth)acrylate, 4-t-butylcyclohexyl (meth)acrylate, dicyclopentenyloxymethyl (meth)acrylate, dicyclopentenyloxyethyl (meth)acrylate, ethoxyethyl (meth)acrylate, ethoxy diethylene glycol (meth)acrylate, 2-hydroxyethyl (meth)acrylate and 2-hydroxypropyl (meth)acrylate; aromatic (meth)acrylates such as benzyl (meth)acrylate, phenyl (meth)acrylate, phenoxyethyl (meth)

acrylate, phenoxy diethylene glycol (meth)acrylate, 1-naphthyl (meth)acrylate, fluorophenyl (meth)acrylate, chlorophenyl (meth)acrylate, cyanophenyl (meth)acrylate, methoxyphenyl (meth)acrylate and biphenyl (meth)acrylate; haloalkyl (meth)acrylates such as fluoromethyl (meth)acrylate and chloromethyl (meth)acrylate; other (meth)acrylate compounds such as alkylamino (meth)acrylates and cyanoacrylate esters; nitrogen-containing monomers such as acrylamide, N,N-dimethylacrylamide. N,N-diethylacrylamide, N-vinylformamide, N-vinylacetamide, N-vinyl-s-caprolactam, N-vinylpyrrolidone, 1-vinylimidazole, N-vinylcarbazole, N-vinylmorpholine, N-vinylpyridine and acryloylmorpholine; as well as styrene, α-methylstyrene, chlorostyrene, styrenesulfonic acid, 4-hydroxystyrene, vinyltoluene, vinyl acetate, vinyl propionate and vinyl benzoate.

Examples of polyfunctional monomers that may be used as the polymerizable monomer (d) include di(meth)acrylates such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, 1,3-butylene glycol di(meth)acrylate, 1,4-butanediol di(meth)acrylate, 1,5-pentanediol di(meth)acrylate, 1,6-hexanediol di(meth)acrylate, neopentyl glycol di(meth)acrylate, 1,9-nonanediol di(meth)acrylate, 1,10-decanediol di(meth)acrylate, dimethyloltricyclodecane di(meth)acrylate, polybutadiene di(meth)acrylate, 2,2-bis(4-(meth)acryloyloxyphenyl)propane, 2,2-bis(4-(ω-(meth)acryloyloxy polyethoxy)phenyl)propane, and bisphenol A ethylene oxide adduct di(meth)acrylates; trifunctional crosslinking monomers such as trimethylolethane tri(meth)acrylate, trimethylolpropane tri(meth)acrylate, trimethylolpropane ethylene oxide adduct triacrylates, and pentaerythritol tri(meth)acrylate; tetrafunctional or higher polyfunctional acrylates such as pentaerythritol tetra(meth)acrylate, pentaerythritol ethylene oxide adduct tetra(meth)acrylates and dipentaerythritol hexa(meth)acrylate; aromatic diallyl carboxylates such as diallyl phthalate, diallyl isophthalate, dimethallyl isophthalate and diallyl terephthalate; and other allyl compounds such as diallyl cyclohexanedicarboxylate and tri(meth)allyl isocyanurate.

Among these polymerizable monomers (d), a monofunctional or difunctional (meth)acrylate is preferred, a monofunctional or difunctional aliphatic (meth)acrylate is more preferred, and ethylene glycol dimethacrylate and isobornyl (meth)acrylate are particularly preferred.

<Vinyl Ester Compound (e)>

The adhesive composition of the present embodiment may include a vinyl ester compound (e). The vinyl ester compound (e) in the adhesive composition of the present embodiment has the functions of enhancing the rigidity of the cured product of the adhesive composition, and improving the adhesive strength to metals and plastics.

There are no particular limitations on the vinyl ester compound (e), and examples include bisphenol vinyl ester resins such as bisphenol A vinyl ester resins, bisphenol AF vinyl ester resins, bisphenol F vinyl ester resins, bisphenol S vinyl ester resins and bisphenol AD vinyl ester resins, and novolac vinyl ester resins such as phenol novolac vinyl ester resins, bisphenol novolac vinyl ester resins, naphthalene novolac vinyl ester resins and cresol novolac vinyl ester resins. Among these vinyl ester compounds (e), bisphenol A vinyl ester resins, phenol novolac vinyl ester resins, bisphenol AF vinyl ester resins and bisphenol F vinyl ester resins are preferred. One of these vinyl ester compounds (e) may be used alone, or a combination of a plurality of compounds may be used.

The total amount of the vinyl ester compound (e) and the rubber (a), relative to 100 parts by mass of the rubber (a), is preferably from 105 to 200 parts by mass, more preferably from 105 to 180 parts by mass, and even more preferably from 110 to 150 parts by mass. Provided the total amount of the rubber (a) and the vinyl ester compound (e) is not more than 200 parts by mass per 100 parts by mass of the rubber (a), the amount of the vinyl ester compound (e) does not become excessive. Accordingly, the effect of the rubber (a) in improving the adhesive strength of the cured product of the adhesive composition to plastics is not impaired. As a result, the adhesive strength of the cured product of the adhesive composition to metals and plastics can be further enhanced. By ensuring that the total amount of the vinyl ester compound (e) and the rubber (a) is at least 105 parts by mass per 100 parts by mass of the rubber (a), the adhesive strength to metals and plastics can be enhanced.

<Inorganic Filler (f)>

The adhesive composition of the present embodiment may also include an inorganic filler (f). The inorganic filler (f) in the adhesive composition of the present embodiment has the functions of improving the workability when the adhesive composition is applied to a substrate, and increasing the mechanical strength of the cured product. The material of the inorganic filler (f) may be selected appropriately with due consideration of the properties required, such as the workability when the adhesive composition is applied to a substrate, and the mechanical strength and external appearance and the like of the cured product of the adhesive composition. Further, by using an insulating filler as the inorganic filler (f), an insulating adhesive composition can be produced. By using a conductive filler as the inorganic filler (f), a conductive adhesive composition can be produced.

There are no particular limitations on the inorganic filler (f), and examples include calcium carbonate, aluminum oxide (alumina), glass fiber, silica, glass powder, glass flakes, magnesium silicate, hydrous magnesium silicate, magnesium carbonate, mica, talc, kaolin, clay, zeolite, asbestos, pearlite, baryte, silica sand, silicon carbide, boron nitride, dolomite, glass balloons, shirasu hollow balloons, aluminum hydroxide, white limestone, zirconium oxide, antimony trioxide, titanium oxide, molybdenum dioxide, carbon black, fine metal powders of silver or copper or the like, and glass beads that have been surface-coated with a metal oxide such as zinc oxide or a metal.

In those cases where the adhesive composition is an insulating adhesive composition, if consideration is given to the ease of availability and the heat resistance and mechanical strength of the cured product, then among these inorganic fillers (f), calcium carbonate, aluminum oxide, glass fiber, silica, talc and aluminum hydroxide are preferred.

In those cases where the adhesive composition is a conductive adhesive composition, among these inorganic fillers (f), carbon black, fine metal powders of silver or copper or the like, and glass beads that have been surface-coated with a metal oxide such as zinc oxide or a metal are preferred.

Products obtained by surface-treating one of the above inorganic fillers (f) may also be used as the inorganic filler (f). One of these inorganic fillers (f) may be used alone, or a combination of a plurality of fillers may be used.

The amount of the inorganic filler (f), relative to 100 parts by mass of the total amount of the rubber (a), the polymerizable monomer (b), the radical polymerization initiator (c), the polymerizable monomer (d) and the vinyl ester compound (e) (the total of (a) to (e) (or the total of (a) to (c) and (e) in those cases where (d) is not included, or the total of (a) to (d) in those cases where (e) is not included, or the total of (a) to (c) in those cases where (d) and (e) are not included)), is preferably from 3 to 1,000 parts by mass, more preferably from 5 to 500 parts by mass, and even more preferably from 30 to 300 parts by mass. By including the inorganic filler (f) in an amount of at least 3 parts by mass per 100 parts by mass of the total of (a) to (e), the viscosity of the radical-curable heat-resistant adhesive composition can be adjusted to a viscosity that enables favorable handling. Further, provided the amount of the inorganic filler (f) is not more than 1,000 parts by mass per 100 parts by mass of the total of (a) to (e), the superior adhesive strength of the cured product of the adhesive composition to metals and plastics can be maintained.

<Thixotropic Agent>

The adhesive composition of the present embodiment may contain a thixotropic agent. The thixotropic agent is used for the purposes of improving the mixability of the adhesive composition, and adjusting the viscosity of the composition to a level suitable for operations such as troweling. A single thixotropic agent may be used alone, or a combination of a plurality of thixotropic agents may be used.

An organic thixotropic agent or an inorganic thixotropic agent may be used as the thixotropic agent.

Examples of organic thixotropic agents include hydrogenated castor oil-based agents, amide-based agents, polyethylene oxide-based agents, polymerized plant-based oil-based agents, surfactant-based agents, and composite agents containing a combination of such agents. One specific example is DISPARLON (a registered trademark) 6900-20X (manufactured by Kusumoto Chemicals, Ltd.).

Examples of inorganic thixotropic agents include hydrophobically treated or hydrophilically treated silica and bentonite, other than the inorganic filler (f). Specific examples of hydrophobic inorganic thixotropic agents include REOLOSIL (a registered trademark) PM-20L (a gas-phase silica manufactured by Tokuyama Corporation), AEROSIL (a registered trademark) R-106 (manufactured by Nippon Aerosil Co., Ltd.), and hydrophobic fumed silica (product name: CAB-O-SIL (manufactured by Cabot Corporation)). Specific examples of hydrophilic inorganic thixotropic agents include AEROSIL (a registered trademark) 200 (manufactured by Nippon Aerosil Co., Ltd.) and the like. In those cases where a hydrophilic pyrogenic silica is used as the inorganic thixotropic agent, the degree of thixotropy can be altered by adding a thixotropic modifier such as BYK (a registered trademark) R605 or BYK (a registered trademark) R606 (manufactured by BYK-Chemie gesellschaft mit beschrankter Haftung).

The amount of the thixotropic agent, relative to 100 parts by mass of the total amount of the rubber (a), the polymerizable monomer (b), the radical polymerization initiator (c), the polymerizable monomer (d), the vinyl ester compound (e) and the inorganic filler (f) (the total of (a) to (f)), is preferably from 0 to 10 parts by mass, more preferably from 0.5 to 8 parts by mass, and even more preferably from 1 to 5 parts by mass. Provided the amount of the thixotropic agent is not more than 10 parts by mass per 100 parts by mass of the total of (a) to (f), an adhesive composition having a viscosity and thixotropic properties that enable favorable handling can be obtained.

<Additives>

The adhesive composition of the present embodiment may, if necessary, also contain other additives. By including additives, the hardness, strength, moldability, durability and water resistance of the cured product of the adhesive composition can be improved. Examples of the additives include silane coupling agents, antifoaming agents, waxes, wetting and dispersing agents, polymerization inhibitors, and curing accelerators and the like. One of these additives may be used alone, or a combination of a plurality of additives may be used.

There are no particular limitations on the amount of additives used, provided the effects of the present invention are not impaired, but the amount of additives per 100 parts by mass of the total of (a) to (f) is preferably from 0 to 20 parts by mass, more preferably from 0 to 10 parts by mass, and even more preferably from 0 to 5 parts by mass.

For the silane coupling agent, a compound having radical polymerizability is preferably used. Specific examples include 3-methacryloxypropyltrimethoxysilane, vinyltrimethoxysilane, vinyltriethoxysilane, and vinyltris(2-methoxyethoxy)silane. Among these, the use of 3-methacryloxypropyltrimethoxysilane as the silane coupling agent is particularly preferred.

Examples of the antifoaming agents include silicone-based antifoaming agents and non-silicone-based antifoaming agents. Specifically, commercially available products including pure silicone-based antifoaming agents such as ST86PA (a product name, manufactured by Dow Corning Toray Silicone Co., Ltd.) may be used. Further, specific examples of non-silicone-based antifoaming agents include DISPARLON P-420 (a product name, manufactured by Kusumoto Chemicals, Ltd.). A single antifoaming agent may be used alone, or a combination of plurality of antifoaming agents may be used.

Conventional materials may be used as the waxes. Specific examples include petroleum waxes (such as paraffin wax and microcrystalline wax), plant-based waxes (such as candelilla wax, rice wax and vegetable wax), animal-based waxes (such as beeswax and spermaceti), mineral-based waxes (such as montan wax), and synthetic waxes (such as polyethylene wax and amide wax). One of these waxes may be used alone, or a combination of two or more waxes may be used.

Commercially available waxes may also be used, including special waxes such as BYK (a registered trademark) S-750 (manufactured by BYK-Chemie Japan K.K.), BYK (a registered trademark) S-740 (manufactured by BYK-Chemie Japan K.K.) and BYK (a registered trademark) LP-S6665 (manufactured by BYK-Chemie Japan K.K.).

Conventional materials may be used as the wetting and dispersing agents. Specific examples include cationic surfactants, anionic surfactants, nonionic surfactants and amphiphilic polymers. One of these wetting and dispersing agents may be used alone, or a combination of a plurality of agents may be used.

Commercially available products such as BYK (a registered trademark) 995 (manufactured by BYK-Chemie Japan K.K.), which is a mixture containing a phosphoric acid polyester, may also be used as the wetting and dispersing agent.

Conventional materials may be used as the polymerization inhibitors. Specific examples include methoquinone, hydroquinone, dibutylhydroxytoluene, tertiary-butylhydroquinone, trimethylhydroquinone, tertiary-butylcatechol, para-benzoquinone, and tertiary-butyl-para-benzoquinone.

One of these polymerization inhibitors may be used alone, or a combination of a plurality of polymerization inhibitors may be used.

The polymerization inhibitor should be used in an amount that does not impair the curability of the adhesive composition.

Conventional materials may be used as the curing accelerators. Specific examples include cobalt naphthenate which reacts with ketone peroxide-based organic peroxides, vanadium pentoxide which reacts with hydroperoxide-based organic peroxides, and dimethylaniline which reacts with diacyl peroxide-based organic peroxides. One of these curing accelerators may be used alone, or a combination of a plurality of curing accelerators may be used.

The curing accelerator is preferably used in an amount that does not impair the storage stability.

[Method for Producing Radical-Curable Adhesive Composition]

The radical-curable adhesive composition includes one-liquid type compositions, and compositions in which two or more liquids are mixed together prior to use. In terms of simplifying the process during use, one-liquid type compositions are preferred.

There are no particular limitations on the method used for producing a one-liquid type adhesive composition of the present embodiment, but for example, production can be achieved by a method in which a "step 1" and a "step 2" described below are performed in sequence.

[Step 1]

The rubber (a) and the polymerizable monomer (b) are mixed together to prepare a mixed liquid (i).

[Step 2]

The mixed liquid (i) and the radical polymerization initiator (c) are mixed together to prepare an adhesive composition composed of a mixed liquid (ii).

There are no particular limitations on the mixing methods used in "step 1" and "step 2", and conventional methods may be used. From the viewpoint of ensuring uniform mixing, and from the viewpoint of suppressing degeneration of the various components, the temperature during the mixing performed in "step 1" and "step 2" is preferably from 10 to 50° C., more preferably from 15 to 40° C., and even more preferably from 15 to 30° C.

When the adhesive composition is produced using a method in which "step 1" and "step 2" are performed in sequence, the storage stability of the adhesive composition can be ensured more easily than a method in which, for example, the rubber (a), the polymerizable monomer (b) and the radical polymerization initiator (c) are mixed together at the same time.

In those cases where the adhesive composition of the present embodiment also includes the polymerizable monomer (d) and/or the vinyl ester compound (e), the polymerizable monomer (d) and/or the vinyl ester compound (e) are preferably mixed uniformly before the radical polymerization starts. Accordingly, in "step 1", the polymerizable monomer (d) and/or the vinyl ester compound (e) are preferably mixed together with the rubber (a) and the polymerizable monomer (b).

Further, in those cases where the adhesive composition of the present embodiment includes other components besides the rubber (a), the polymerizable monomer (b), the radical polymerization initiator (c), the polymerizable monomer (d) and the vinyl ester compound (e), from the viewpoint of ensuring uniform mixing of the various components, a "step 3" described below is preferably performed after "step 2".

[Step 3]

The mixed liquid (ii) obtained in "step 2" and the other components are mixed together to prepare the adhesive composition.

[Method for Curing Radical-Curable Adhesive Composition]

Although not a particular limitation, from the viewpoint of productivity, the adhesive composition of the present embodiment is preferably cured by heating. There are no particular limitations on the method used for heating the adhesive composition, but from the viewpoint of ensuring uniform heating of the adhesive composition, a thermostatic chamber is preferably used.

From the viewpoint of the production efficiency for the cured product, the adhesive composition heating time is preferably within a range from 1 minute to 24 hours, and may be adjusted in accordance with the curing time required from the start of heating of the adhesive composition until a cured product is obtained. In those cases where the radical polymerization initiator (c) is an organic peroxide, the curing time for the adhesive composition can be adjusted by using a heating temperature that takes into consideration the half-life characteristics of the organic peroxide.

From the viewpoint of the production efficiency for the cured product, the heating temperature (curing temperature) for the adhesive composition is preferably set to a temperature higher than the one-hour half-life temperature of the radical polymerization initiator (c). Further, when the adhesive composition is used as an adhesive, the heating temperature mentioned above is preferably lower than the temperature at which the substrate being bonded undergoes deformation or degeneration.

The adhesive composition of the present embodiment contains the rubber (a), the polymerizable monomer (b) and the radical polymerization initiator (c). Accordingly, by curing the adhesive composition of the present embodiment, a cured product that exhibits superior adhesive strength to metals and plastics under high-temperature conditions can be obtained.

Specifically, a cured product of the adhesive composition of the present embodiment is able to achieve superior adhesive strength, within a temperature range from normal temperature to about 200° C., to substrates composed of the types of metals used as electrical and electronic component materials such as iron and aluminum.

Further, a cured product of the adhesive composition of the present embodiment is also able to achieve superior adhesive strength, within a temperature range from normal temperature to about 200° C., to substrates composed of the types of engineering plastics used as electrical and electronic component materials such as polyphenylene sulfide (PPS).

Furthermore, a cured product of the adhesive composition of the present embodiment is also able to achieve superior adhesive strength to substrates composed of other plastics used as electrical and electronic component materials such as 6,6-nylon, within a temperature range from normal temperature to the temperature at which the substrate undergoes deformation or degeneration.

Accordingly, in those cases where, for example, components or the like composed of a metal and/or plastic described above are used as substrates, and an aforementioned cured product is formed between two of these substrates to bond the two substrates together, the surface of the substrates which contact the cured product need not necessarily be subjected to a preliminary surface treatment. Accordingly, the two substrates can be bonded efficiently.

Further, in those cases where the adhesive composition of the present embodiment is an insulating adhesive composition obtained by appropriate selection of the inorganic filler (f), in order to achieve favorable insulating properties, the insulation resistance of the cured product of the adhesive composition is preferably within a range from $1\times10^{13}$ Ωcm$^2$ to $1\times10^{16}$ Ωcm$^2$.

These properties enable the adhesive composition of the present embodiment to be used favorably as an adhesive and/or an encapsulating agent for electrical and electronic componentry, and as an adhesive for transportation equipment.

[Adhesive]

An adhesive of an embodiment of the present invention contains the adhesive composition of the above embodiment. Accordingly, the adhesive of this embodiment exhibits superior adhesive strength to substrates composed of metals and/or plastics under high-temperature conditions.

In the present embodiment, an adhesive formed from the adhesive composition described above was described as an example, but the adhesive of the present invention need only contain the adhesive composition of the present invention. Accordingly, the adhesive of the present invention may be composed solely of the adhesive composition of the present invention, or may contain the adhesive composition of the present invention together with one or more other components. Examples of these other components include the types of components contained in conventional adhesives.

[Electrical or Electronic Component]

An electrical or electronic component of an embodiment of the present invention includes a component that has been bonded and/or encapsulated using a cured product of the adhesive composition of the above embodiment. Accordingly, the electrical or electronic component of this embodiment has favorable heat resistance.

[Transportation Device]

A transportation device of an embodiment of the present invention includes a component that has been bonded using a cured product of the adhesive composition of the above embodiment. Accordingly, the transportation device of this embodiment has favorable heat resistance.

EXAMPLES

The present invention is described below in further detail using a series of examples and comparative examples. However, the present invention is in no way limited by the following examples.

[Preparation of Adhesive Compositions]

Using the method described below, adhesive compositions of Examples 1 to 8 and Comparative Examples 1 to 6 were prepared containing the materials shown in Table 1 in the mass ratios shown in Table 2 and Table 3.

The numerical values shown for the components (a) to (f) in Table 2 and Table 3 represent mass (g) values.

Moreover, Table 2 and Table 3 also show the total amount (parts by mass) of the component (b) and the component (d) per 100 parts by mass of the component (a), the amount (parts by mass) of the component (b) per 100 parts by mass of the total of the component (b) and the component (d), the total amount (parts by mass) of the component (a) and the component (e) per 100 parts by mass of the component (a), the amount (parts by mass) of the component (c) per 100 parts by mass of the total of the components (a), (b), (d) and (e), the amount (parts by mass) of the component (f) per 100 parts by mass of the total of the components (a) to (e), and the amount (parts by mass) of the thixotropic agent per 100 parts by mass of the total of the components (a) to (f).

TABLE 1

| Name | Manufacturer | Product name • remarks |
| --- | --- | --- |
| Acrylate-modified rubber | Showa Denko K.K. | RIPOXY EFN-1000 (molecular weight: 3400), main chain is an acrylonitrile-butadiene copolymer having terminals modified with (meth)acrylate, liquid at 25° C., viscosity at 27° C.: 500 Pa · s |
| Bisphenol A vinyl ester resin | Showa Denko K.K. | RIPOXY VR-77 |
| Phenol novolac vinyl ester resin | Showa Denko K.K. | RIPOXY H-600 |
| Glycidyl methacrylate | Showa Denko K.K. | BLENMER G |
| Acrylonitrile | Showa Denko K.K. | Acrylonitrile |
| Ethylene glycol dimethacrylate | Kyoeisha Chemical Co., Ltd. | LIGHT ESTER EG |
| Isobornyl methacrylate | Kyoeisha Chemical Co., Ltd. | LIGHT ESTER IBX |
| Isobornyl acrylate | Kyoeisha Chemical Co., Ltd. | LIGHT ESTER IBXA |
| Curing agent 1 | NOF Corporation | PERHEXA HC: 1,1-di(t-hexylperoxy)cyclohexane (one-hour half-life temperature: 107° C.) |
| Curing agent 2 | NOF Corporation | PERBUTYL O: t-butyl peroxy-2-ethylhexanoate (one-hour half-life temperature: 92° C.) |
| Silane coupling agent | Shoko High Polymer Co., Ltd. | SCA-503 |
| Glass fiber | Central Glass Co., Ltd. | Milled fiber |
| Glass flakes | NSG Group | Glass flakes RCF-015 |
| Hydrous magnesium silicate | Fuji Talc Industrial Co., Ltd. | Talc MS410 |
| Thixotropic agent | Cabot Corporation | CAB-O-SIL TS-720 fumed silica |
| Additive (silane coupling agent) | Shin-Etsu Chemical Co., Ltd. | KBM-503 |
| Methacrylic acid | Kuraray Corporation | Methacrylic acid |

TABLE 2

| Component | Name | Example 1 | Example 2 | Example 3 | Example 4 | Example 5 | Example 6 | Example 7 | Example 8 |
|---|---|---|---|---|---|---|---|---|---|
| (a) | Acrylate-modified rubber (g) | 70 | 70 | 70 | 70 | 70 | 60 | 60 | 60 |
| (b) | Glycidyl methacrylate (g) | 30 | 30 | 20 | 20 | 20 | 30 | 30 | 30 |
| (c) | Curing agent 1 (g) | 2 | | 2 | 2 | 2 | 2 | 2 | 2 |
| | Curing agent 2 (g) | | 2 | | | | | | |
| (d) | Acrylonitrile (g) | | | | | | | | |
| | Ethylene glycol dimethacrylate (g) | | | 10 | 10 | 10 | | | |
| | Isobornyl methacrylate (g) | | | | | | | | 10 |
| | Isobornyl acrylate (g) | | | | | | | | |
| (e) | Bisphenol A vinyl ester resin (g) | | | | | | 10 | | |
| | Phenol novolac vinyl ester resin (g) | | | | | | | 10 | |
| (f) | Glass fiber (g) | | | | 30 | 30 | 30 | 30 | 30 |
| | Glass flakes (g) | | | | 40 | 40 | 40 | 40 | |
| | Hydrous magnesium silicate (g) | | | | 30 | 30 | 30 | 30 | 70 |
| | Thixotropic agent (g) | | | | 3 | 5 | 3 | 3 | 2 |
| | Additive (silane coupling agent) (g) | | | | 1 | 1 | 1 | 1 | 1 |
| | Methacrylic acid (g) | | | | | | | | |
| | Total amount (parts by mass) of (b) and (d) per 100 parts by mass of (a) | 43 | 43 | 43 | 43 | 43 | 50 | 50 | 67 |
| | Amount (parts by mass) of (b) per 100 parts by mass of total amount of (b) and (d) | 100 | 100 | 67 | 67 | 67 | 100 | 100 | 75 |
| | Total amount (parts by mass) of (a) and (e) per 100 parts by mass of (a) | 100 | 100 | 100 | 100 | 100 | 117 | 117 | 100 |
| | Amount (parts by mass) of (c) per 100 parts by mass of (a) + (b) + (d) + (e) | 2.0 | 2.0 | 2.0 | 2.0 | 2.0 | 2.0 | 2.0 | 2.0 |
| | Amount (parts by mass) of (f) per 100 parts by mass of (a) to (e) | 0 | 0 | 0 | 98 | 98 | 98 | 98 | 98 |
| | Amount (parts by mass) of thixotropic agent per 100 parts by mass of (a) to (f) | 0.0 | 0.0 | 0.0 | 1.5 | 2.5 | 1.5 | 1.5 | 1.0 |

TABLE 3

| Component | Name | Comparative Example 1 | Comparative Example 2 | Comparative Example 3 | Comparative Example 4 | Comparative Example 5 | Comparative Example 6 |
|---|---|---|---|---|---|---|---|
| (a) | Acrylate-modified rubber (g) | 70 | 70 | 60 | 70 | | |
| (b) | Glycidyl methacrylate (g) | | | | | 30 | 30 |
| (c) | Curing agent 1 (g) | | 2 | 2 | 2 | 2 | 2 |
| | Curing agent 2 (g) | 2 | | | | | |
| (d) | Acrylonitrile (g) | 30 | | | | | |
| | Ethylene glycol dimethacrylate (g) | | 30 | | | | |
| | Isobornyl methacrylate (g) | | | | | | |
| | Isobornyl acrylate (g) | | | 40 | | | |
| (e) | Bisphenol A vinyl ester resin (g) | | | | 70 | | |
| | Phenol novolac vinyl ester resin (g) | | | | | | 70 |

TABLE 3-continued

| Component | Name | Comparative Example 1 | Comparative Example 2 | Comparative Example 3 | Comparative Example 4 | Comparative Example 5 | Comparative Example 6 |
|---|---|---|---|---|---|---|---|
| (f) | Glass fiber (g) | | | | | | |
| | Glass flakes (g) | | | | | | |
| | Hydrous magnesium silicate (g) | | | | | | |
| | Thixotropic agent (g) | 2 | | | | | |
| | Additive (silane coupling agent) (g) | | | | | | |
| | Methacrylic acid (g) | | | | 20 | | |
| | Total amount (parts by mass) of (b) and (d) per 100 parts by mass of (a) | 43 | 43 | 67 | 0 | — | — |
| | Amount (parts by mass) of (b) per 100 parts by mass of total amount of (b) and (d) | 0 | 0 | 0 | — | 100 | 100 |
| | Total amount (parts by mass) of (a) and (e) per 100 parts by mass of (a) | 100 | 100 | 100 | 100 | — | — |
| | Amount (parts by mass) of (c) per 100 parts by mass of (a) + (b) + (d) + (e) | 2.0 | 2.0 | 2.0 | 2.9 | 2.0 | 2.0 |
| | Amount (parts by mass) of (f) per 100 parts by mass of (a) to (e) | 0 | 0 | 0 | 0 | 0 | 0 |
| | Amount (parts by mass) of thixotropic agent per 100 parts by mass of (a) to (f) | 2.0 | 0.0 | 0.0 | 0.0 | 0.0 | 0.0 |

Examples 1 to 3, Comparative Examples 2, 3, 5 and 6

The components (a) to (e) were placed in disposable cups in the mass ratios shown in Table 2 and Table 3, and a Disper (manufactured by Primix Corporation) was used to mix the components for 10 minutes at 25° C. thus obtaining a series of adhesive compositions.

Examples 4 to 8, Comparative Example 1

The components (a) to (e) were placed in disposable cups in the mass ratios shown in Table 2 and Table 3, and a Disper (manufactured by Primix Corporation) was used to mix the components for 10 minutes at 25° C., thus obtaining a series of mixtures. The component (f), the thixotropic agent and the silane coupling agent were then added to these mixtures in the mass ratios shown in Table 2 and Table 3, and the Disper was used to performed mixing for 10 minutes at 25° C., thus obtaining a series of adhesive compositions.

Comparative Example 4

The component (a), the component (c) and methacrylic acid were placed in a disposable cup in the mass ratio shown in Table 3, and a Disper (manufactured by Primix Corporation) was used to mix the components for 10 minutes at 25° C., thus obtaining an adhesive composition.

Cured products of the adhesive compositions of Examples 1 to 8 and Comparative Examples 1 to 6 obtained in the manner described above were measured for insulation resistance and adhesive strength using the methods described below.

<Insulation Resistance Measurement>

A 2 mm spacer was inserted between two glass substrates to which a PET film had been adhered, the adhesive composition was injected into the 2 mm space, and the adhesive composition was cured by heating for 30 minutes in a 150° C. thermostatic chamber, thus forming a plate. A circular test piece for measuring insulation resistance having a diameter of about 100 mm and a thickness of 2 mm was prepared from the above molded plate. Based on the test for "5.13 Resistivity" disclosed in Japanese Industrial Standard JIS K-6911 "Testing Methods for Thermosetting Plastics", the insulation resistance of the cured product (test piece) of each adhesive composition was measured.

The results of measuring the insulation resistance in this manner revealed that the insulation resistance of the cured products of the adhesive compositions of Examples 1 to 8 and Comparative Examples 1 to 6 were within a range from $1 \times 10^{13}$ $\Omega cm^2$ to $1 \times 10^{16}$ $\Omega cm^2$, and exhibited high insulation resistance.

<Adhesive Strength Measurement>

Using the method described below, a test piece for measuring the adhesive strength was prepared from each of the materials described below, and the adhesive strength of the cured product of each adhesive composition was measured based on Japanese Industrial Standard JIS K-6850: 1999 "Adhesives—Determination of tensile lap-shear strength of rigid-to-rigid bonded assemblies".

In the adhesive strength measurement, the test speed was set to 5 mm/min, and the temperature of the test environment was set to either 23° C. or 200° C. When nylon 66 was used as the material for the test piece, the temperature of the test environment was set to either 23° C. or 140° C. The value obtained by dividing the maximum stress by the adhesion surface area was recorded as the adhesive strength (MPa). The results of the measurements are shown in Table 4 and Table 5.

The materials used for the test pieces were sheets of 2 mm×25 mm×100 mm formed from iron (rolled steel for general-purpose structures, SS400, no surface treatment), aluminum (5000 series alloy, A5052, no surface treatment), polyphenylene sulfide (PPS) (a molded item of Susteel GS 40-11, manufactured by Tosoh Corporation, no surface treatment), or nylon 66 (N66, manufactured by Toray Plastics Precision Co., Ltd., no surface treatment).

The adhesive composition was applied to the bonding surface of one test piece to form a coating film, and the bonding surface of the other test piece was then superimposed on the first test piece with the coating film disposed therebetween. Subsequently, the adhesive composition was cured using the method described below to prepare a test piece for measuring the adhesive strength. The thickness of the coating film following curing (the thickness of the cured product) was 0.1 to 0.2 mm.

In Examples 1 and 3 to 8, and Comparative Examples 2 to 6, the adhesive composition was cured by heating for 30 minutes in a 150° C. thermostatic chamber.

In Example 2 and Comparative Example 1, the adhesive composition was cured by heating for 30 minutes in a 120° C. oven.

TABLE 4

| Test | | | Example 1 | Example 2 | Example 3 | Example 4 | Example 5 | Example 6 | Example 7 | Example 8 |
|---|---|---|---|---|---|---|---|---|---|---|
| Adhesive strength (MPa) | 23° C. | Iron | 18 | 20 | 13 | 12 | 16 | 20 | 14 | 16 |
| | | Aluminum | 14 | 15 | 10 | 11 | 14 | 16 | 1.3 | 13 |
| | | PPS | 6.0 | 3.7 | 5.6 | 7.2 | 3.1 | 5.6 | 4.6 | 2.9 |
| | | Nylon | 3.0 | 4.6 | 5.2 | 6.9 | 3.0 | 3.3 | 3.8 | 4.1 |
| | 200° C. | Iron | 1.5 | 1.0 | 1.9 | 3.4 | 4.6 | 2.4 | 1.5 | 2.5 |
| | | Aluminum | 1.4 | 1.2 | 1.9 | 2.7 | 3.4 | 3.3 | 1.7 | 3.0 |
| | | PPS | 1.6 | 1.0 | 1.4 | 1.6 | 1.1 | 1.7 | 1.4 | 1.8 |
| | 140° C. | Nylon | 1.0 | 1.4 | 1.4 | 1.1 | 1.2 | 1.6 | 1.4 | 1.5 |

TABLE 5

| Test | | | Comparative Example 1 | Comparative Example 2 | Comparative Example 3 | Comparative Example 4 | Comparative Example 5 | Comparative Example 6 |
|---|---|---|---|---|---|---|---|---|
| Adhesive strength (MPa) | 23° C. | Iron | 0.2 | 0.1 | 18 | 18 | 0.6 | 1.1 |
| | | Aluminum | 0.1 | 0.1 | 19 | 15 | 0.3 | 1.2 |
| | | PPS | 3.6 | 0.0 | 0.7 | 7.0 | 0.3 | 0.5 |
| | | Nylon | 1.6 | 0.1 | 0.6 | 5.0 | 0.1 | 0.0 |
| | 200° C. | Iron | 0.0 | 0.0 | 1.2 | 1.7 | 0.1 | 0.1 |
| | | Aluminum | — | 0.0 | 1.3 | 1.0 | 0.0 | 0.1 |
| | | PPS | 0.2 | — | 0.1 | 0.3 | — | — |
| | 140° C. | Nylon | 0.1 | — | — | 0.0 | — | — |

— indicates that detachment occurred during heating of the test piece

As shown in Table 4, the cured products of the adhesive compositions of Examples 1 to 8 had good adhesive strength to iron, aluminum and polyphenylene sulfide (PPS) at both 23° C. and high-temperature conditions of 200° C. Further, the cured products of the adhesive compositions of Examples 1 to 8 also had good adhesive strength to nylon 66 at both 23° C. and high-temperature conditions of 140° C.

In contrast, as shown in Table 5, Comparative Examples 1 to 6 did not have satisfactory adhesive strength to all of iron, aluminum and PPS under high-temperature conditions of 200° C., as well as nylon under high-temperature conditions of 140° C.

In particular, in Comparative Example 1, when aluminum was used for the test pieces, detachment occurred during heating when attempting to measure the adhesive strength at 200° C. Further, in Comparative Examples 2, 3, 5 and 6, when polyphenylene sulfide (PPS) was used for the test pieces, detachment occurred during heating when attempting to measure the adhesive strength at 200° C. Furthermore, in Comparative Examples 2, 3, 5 and 6, when nylon 66 was used for the test pieces, detachment occurred during heating when attempting to measure the adhesive strength at 140° C. Moreover, in Comparative Example 4, when nylon 66 was used for the test pieces, the adhesive strength at 140° C. was 0.0 MPa.

The invention claimed is:

1. A radical-curable adhesive composition comprising:
a rubber (a) having one or more (meth)acryloyl groups within a single molecular chain,
a polymerizable monomer (b) having both an epoxy group and a (meth)acryloyloxy group in each molecule,
a radical polymerization initiator (c),
a polymerizable monomer (d) other than the polymerizable monomer (b) and excluding (meth)acrylic acid, and
a vinyl ester compound (e),
wherein the vinyl ester compound (e) is one or more compounds selected from the group consisting of bisphenol vinyl ester resins and novolak vinyl ester resins.

2. The radical-curable adhesive composition according to claim 1, wherein the rubber (a) is a polymer of a monomer comprising at least acrylonitrile.

3. The radical-curable adhesive composition according to claim 1, wherein the main chain of the rubber (a) is a copolymer of acrylonitrile and butadiene.

4. The radical-curable adhesive composition according to claim 1, wherein the polymerizable monomer (b) comprises glycidyl (meth)acrylate.

5. The radical-curable adhesive composition according to claim 1, wherein a total amount of the polymerizable monomer (b) and the polymerizable monomer (d) other than the polymerizable monomer (b) and excluding (meth)acrylic acid is from 20 to 200 parts by mass per 100 parts by mass of the rubber (a).

6. The radical-curable adhesive composition according to claim 1, wherein an amount of the polymerizable monomer (b) is from 10 to 100 parts by mass per 100 parts by mass of a total amount of the polymerizable monomer (b) and the polymerizable monomer (d) other than the polymerizable monomer (b) and excluding (meth)acrylic acid.

7. The radical-curable adhesive composition according to claim 1, wherein a total amount of the rubber (a) and the vinyl ester compound (e) is from 105 to 200 parts by mass per 100 parts by mass of the rubber (a).

8. The radical-curable adhesive composition according to claim 1, further comprising an inorganic filler (f).

9. The radical-curable adhesive composition according to claim 8, comprising 3 to 1,000 parts by mass of the inorganic filler (f) per 100 parts by mass of a total amount of the rubber (a), the polymerizable monomer (b), the radical polymerization initiator (c), the polymerizable monomer (d) other than the polymerizable monomer (b) and excluding (meth)acrylic acid, and the vinyl ester compound (e).

10. The radical-curable adhesive composition according to claim 1, wherein a cured product of the adhesive composition has insulating properties.

11. An adhesive comprising the radical-curable adhesive composition according to claim 1.

12. An electrical or electronic component in which a component has been bonded and/or encapsulated using a cured product of the radical-curable adhesive composition according to claim 1.

13. A transportation device in which a component has been bonded using a cured product of the radical-curable adhesive composition according to claim 1.

* * * * *